Feb. 1, 1944.  W. C. ZACHOW  2,340,499
DISK VALVE CONNECTION
Filed Oct. 18, 1941  2 Sheets-Sheet 1
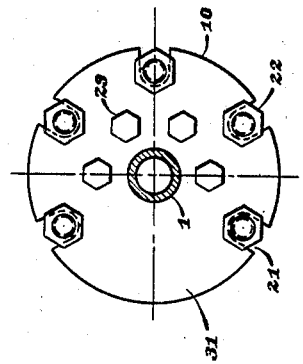
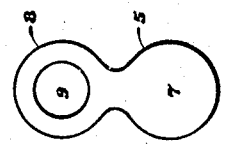
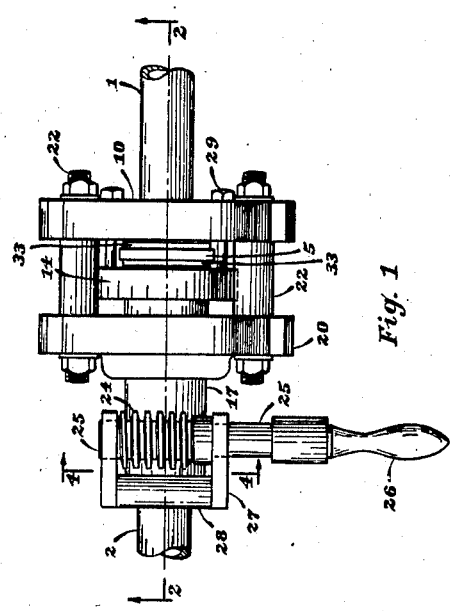
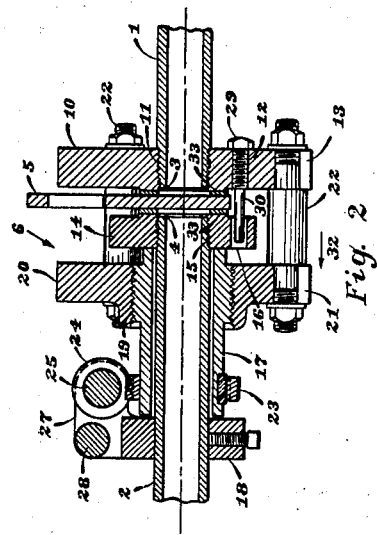
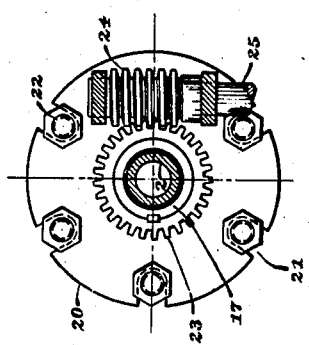
Inventor
William C. Zachow
By Norbert E Birch
Attorney Feb. 1, 1944.      W. C. ZACHOW      2,340,499
DISK VALVE CONNECTION
Filed Oct. 18, 1941      2 Sheets-Sheet 2

Inventor
William C. Zachow
By Norbert E. Buch
Attorney

Patented Feb. 1, 1944

2,340,499

UNITED STATES PATENT OFFICE 2,340,499

DISK VALVE CONNECTION

William C. Zachow, Springfield, Pa., assignor to The Atlantic Refining Company, Philadelphia, Pa., a corporation of Pennsylvania Application October 18, 1941, Serial No. 415,523

7 Claims. (Cl. 251—167)

This invention relates to disk valves of the type employed between adjacent pipe ends, and more particularly to means for securing the adjacent pipe ends in tight relation with the disk valve following interposition of the disk valve therebetween and for relatively spreading the adjacent pipe ends for interchange of the disk valve.

One of the objects of the invention is the provision of novel means for securing adjacent pipe ends in tight relation with a disk valve following interposition of the disk valve therebetween and for relatively spreading the adjacent pipe ends for interchange of the disk valve.

Another object of the invention is the provision of means for facilitating the interchange of a disk valve between adjacent pipe ends, a means which is economical to manufacture and simple to operate.

Other objects of the invention will be apparent from the description and claims which follow.

Reference is now had to the drawings in which like characters of reference are used to designate similar elements.

Figure 1 is a top plan view exemplifying one form of the device constructed in accordance with the present invention.

Figure 2 is a side sectional view taken on line 2—2 of Figure 1.

Figure 3 is an end view of the device shown in Figure 1.

Figure 4 is another end end view of the device shown in Figure 1.

Figure 9 is a plan view exemplifying one form of disk valve which may be employed with either of the devices shown in the drawings.

Figure 7:
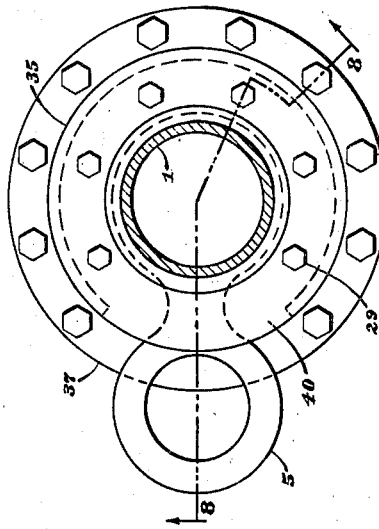
Figure 7 is another end view of the device shown in Figure 5.

The device shown in the drawings, particularly reference being had to Figures 1 to 4, inclusive, shows a pair of opposed sections 1 and 2 of a continuous pipe line having spaced adjacent ends 3 and 4 for the interposition of disk valve 5 therebetween, and means 6 for securing pipe ends 3 and 4 in tight relation with valve 5 following interposition of valve 5, and for relatively spreading pipe ends 3 and 4 for interchange of valve 5. The valve disk shown in Figure 9 is exemplary of the type which may be employed with the present invention, and comprises solid disk section 7 for totally blanking the line and orifice disk section 8 provided with opening 9 of suitable size, for controlling the flow through the line. It will be seen that the use of the dual type of disk valve shown in Fig. 9 readily facilitates interchange of the valve since the unemployed section thereof readily lends itself as a lifting means for the employed section thereof.

The means 6 comprises relatively large peripheral flange 10 rigidly affixed, as by threads 11, to the end of pipe section 1, the flange 10 being provided with a plurality of threaded openings 12 adjacent its inner peripheral edge and a plurality of slotted openings 13 adjacent its outer peripheral edge. Relatively small peripheral flange 14 is rigidly affixed, as by threads 15, to the end of pipe section 2 and is provided with a plurality of guide openings 16 correspondingly arranged with threaded openings 12. Flange 14 serves as an abutment for thrust movement in one direction of collar 17 loosely fitted for rotation about the outer periphery of pipe section 2, thrust movement of collar 17 in the opposite direction being prevented by ring 18, pinioned or otherwise rigidly secured to the outer surface of pipe section 2. Collar 17 is exteriorly threaded, as at 19, and on which ring 20 is carried. Ring 20 has a diameter substantially equal to the diameter of flange 10 and is provided with peripheral slotted openings 21 corresponding to openings 13, whence it is seen, ring 20 is rigidly joined with flange 10, as by shoulder bolts 22, fitted within slotted openings 21 and 13, respectively.

Collar 17 is rotated through the medium of worm wheel 23 pinioned or otherwise rigidly secured to collar 17 and driven by worm 24 pinioned or otherwise rigidly secured to shaft 25 provided with crank means 26. Shaft 25 is journaled within arms 27 of bracket 28 which is rigidly secured to pipe section 2, for example, as by ring 18. Dowel bolts 29 are fixed within threaded openings 12 with their free ends 30 extended within guide openings 16. Dowel bolts 29, it is seen, serve to hold the pipe ends 3 and 4 in longitudinal alignment during interchange of disk valve 5, and also to prevent relative rotation of the pipe ends 3 and 4 thereby causing a direct rotatable force to be applied to collar 17 with respect to ring 20. If desired, gaskets 33 may be provided on either side of disk valve 5.

As seen in Figure 3, shoulder bolts 22 and dowel bolts 29 are correspondingly arranged in an incomplete circle providing free segment 31 for the insertion or removal of a valve 5. Also, as seen in Figure 2 dowel bolts 29 in their aggregate serve to seat valve 5 pending take-up of ends 3 and 4.

In the use of the device, shaft 25 is rotated in a clockwise direction as viewed in Figure 2, whence worm wheel 23 and collar 17 are rotated in a counterclockwise direction as viewed in Figure 4. The collar 17, through co-action of the threaded portion 19 thereof with the threaded portion of stationary ring 20, is backed off in the direction of the arrow indicated by the numeral 32, whereby pressure upon the flange 14 carried at end 4 of pipe 2 is relieved. When the outer end of collar 17 abuts ring 18, the resulting pressure causes pipe 2 carrying flange 14 to move in the direction of arrow 32, thus parting the flange 14 from contact with the disk valve 5, and permitting withdrawal of valve 5 for interchange. Valve 5 having been changed, movements of the various elements in an opposite direction are brought about whence pipe end 4 carrying flange 14 is moved in a direction toward pipe end 3 carrying flange 10 and consequently in tight relation with valve 5 interposed therebetween.

Figure 5:
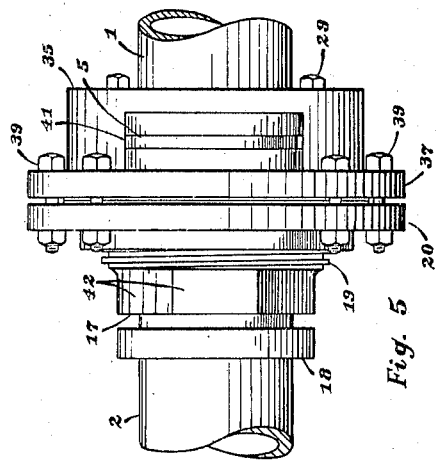
Figure 5 is a top plan view showing another form of the device constructed in accordance with the present invention.
Figure 8:
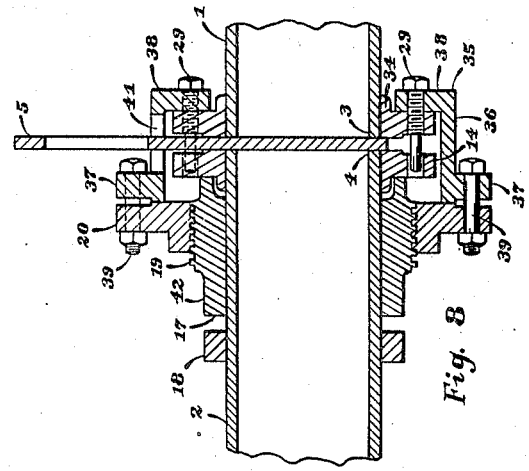
Figure 8 is a side sectional view taken on line 8—8 of Figure 7.
Figure 6:
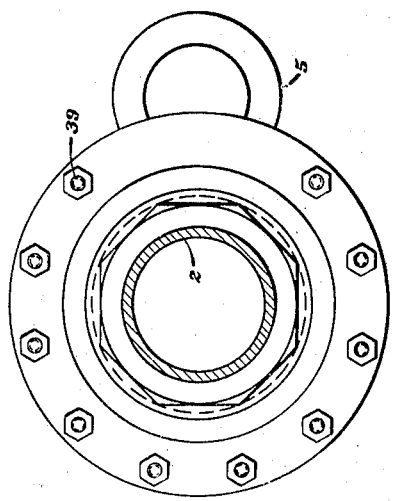
Figure 6 is an end view of the device shown in Figure 5.

Referring now more particularly to the form of the invention disclosed in Figures 5 to 8, inclusive, it is seen that instead of flange 10 of relatively large diameter, flange 34 having a diameter similar to flange 14 is employed, and that flange 34 is rigidly joined with ring 20, as by hub 35, the hub 35 comprising tubular portion 36 provided with opposite end shoulders, for example, outwardly turned end shoulder 37 and inwardly turned end shoulder 38. End shoulder 38 is rigidly joined with flange 34 through the medium of dowel bolts 29 and end shoulder 37 is rigidly joined with ring 20, as by bolts 39.

In the form of the invention just described, dowel bolts 29 are similarly arranged in an incomplete circle providing open segment 40 correspondingly arranged with transverse, peripheral opening 41 in hub 35, for free movement of disk valve 5 during interchange of valve 5. Also, in the form of the invention just described collar 17 is shown provided with conventional engaging surfaces 42 for rotating collar 17.

I claim:

1. The combination of a pair of opposed pipe sections having disk valve interposable between adjacent ends thereof and means for securing the adjacent pipe ends in tight relation with the disk valve following interposition of the disk valve therebetween and for relatively spreading the adjacent pipe ends for interchange of the disk valve; one of said pipe sections being provided at its adjacent end with a fixed peripheral flange and the other of said pipe sections being provided at its adjacent end with a fixed peripheral abutment, a fixed peripheral thrust means spaced from the abutment and an exteriorly threaded collar rotatably mounted about its outer periphery intermediate the abutment and thrust means, means slidably connecting said flange and abutment to prevent relative rotation of said pipe ends, a ring threaded on said collar, means rigidly joining said flange and said ring, and means including a worm wheel and a worm for rotating said threaded collar.

2. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; comprising a flange integral with each of said pipe sections and at their adjacent ends, the flange of one pipe section being relatively large in diameter and having a plurality of threaded openings adjacent its inner periphery and a plurality of slotted openings adjacent its outer periphery, the flange of the other of said pipe sections being relatively smaller in diameter and having a plurality of guide openings correspondingly arranged with said threaded openings, the last mentioned pipe section being provided with a fixed peripheral thrust means spaced from its flange and a rotatable, exteriorly threaded collar intermediate its flange and the thrust means, a ring threaded on said collar, said ring having a diameter and slotted openings corresponding respectively with the diameter and slotted openings of the relatively larger flange shoulder, bolts rigidly securing said relatively larger flange and said ring in spaced relation with the respective slotted openings, and dowel bolts fixed within said threaded openings and extending within said guide openings.

3. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; comprising a flange integral with each of said pipe sections and at their adjacent ends, the flange of one pipe section being relatively large in diameter and having a plurality of threaded openings adjacent its inner periphery and a plurality of slotted openings adjacent its outer periphery, the flange of the other of said pipe sections being relatively smaller in diameter and having a plurality of guide openings corresponding with said threaded openings, the last mentioned pipe section being provided with a fixed peripheral thrust means spaced from its flange and a rotatable, exteriorly threaded collar intermediate its flange and the thrust means, a ring threaded on said collar, said ring having a diameter and slotted openings corresponding respectively with the diameter and slotted openings of the relatively larger flange, shoulder bolts rigidly securing said relatively larger flange and said ring in spaced relation within the respective slotted openings, and dowel bolts fixed within said threaded openings and extending within said guide openings, said shoulder members and said dowel bolts being correspondingly arranged in an incomplete circle thereby providing clearance for the removal and insertion of a disk valve from and between said pipe ends.

4. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; one of said sections being provided at its adjacent end with a fixed peripheral abutment, a fixed peripheral thrust means spaced from the abutment and an exteriorly threaded collar rotatably mounted about its outer periphery intermediate the abutment and thrust means, and means slidably connected to said flange and abutment to prevent relative rotation of said pipe ends, a ring threaded on said collar, said ring being rigidly joined with the other of said pipe sections.

5. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; one of said pipe sections being provided at its adjacent end with a fixed peripheral abutment, a fixed peripheral thrust means spaced from the abutment and an exteriorly threaded collar rotatably mounted about its periphery intermediate the abutment and thrust means, means slidably connecting said flange and abutment to prevent relative rotation of said pipe ends, a ring threaded on said collar, said ring being rigidly joined with the other of said pipe sections, and means including a worm wheel pinioned to said threaded collar and a rotatable worm provided with crank means cooperatively associated with the worm wheel to rotate said threaded collar.

6. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; one of said pipe sections being provided at its adjacent end with a fixed peripheral flange and the other of said pipe sections being provided at its adjacent end with a fixed peripheral abutment, a fixed peripheral thrust means spaced from the abutment and an exteriorly threaded collar rotatably mounted about its outer periphery intermediate the abutment and thrust means, means slidably connecting said flange and abutment to prevent relative rotation of the pipe ends, a ring threaded on said collar and means rigidly joining said flange and said ring.

7. The combination of a pair of opposed pipe sections having a disk valve interposable between adjacent ends thereof and means for securing the adjacent pipe ends in tight relation with the disk valve following interposition of the disk valve therebetween and for relatively spreading the adjacent pipe ends for interchange of the disk valve; one of said pipe sections being provided at its adjacent end with a fixed peripheral flange and the other of said pipe sections being provided at its adjacent end with a fixed peripheral abutment, a fixed peripheral thrust means spaced from the abutment and an exteriorly threaded collar rotatably mounted about its outer periphery intermediate the abutment and thrust means, means slidably connecting said flange and abutment to prevent relative rotation of the pipe ends, a ring threaded on said collar, and means including a hub having opposite end shoulders rigidly joining said flange with said ring, said hub having a transverse peripheral opening for the interchange of said disk valve.

WILLIAM C. ZACHOW.